Sept. 26, 1933.                C. L. OSWALD ET AL               1,928,392
              RECORDATION AND REPRODUCTION OF SOUND AND THE
                 PROCESS THEREOF AND APPARATUS THEREFOR
                      Filed Oct. 29, 1928            6 Sheets-Sheet 4
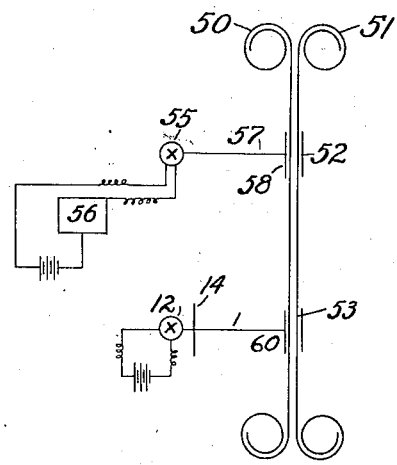
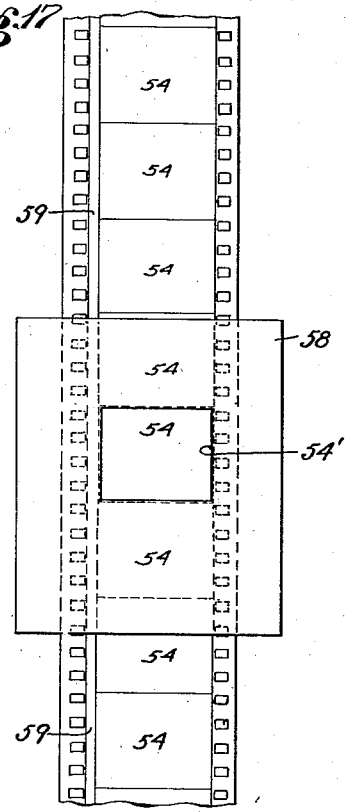
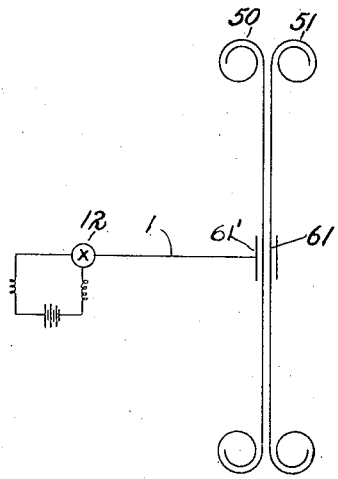
INVENTORS.

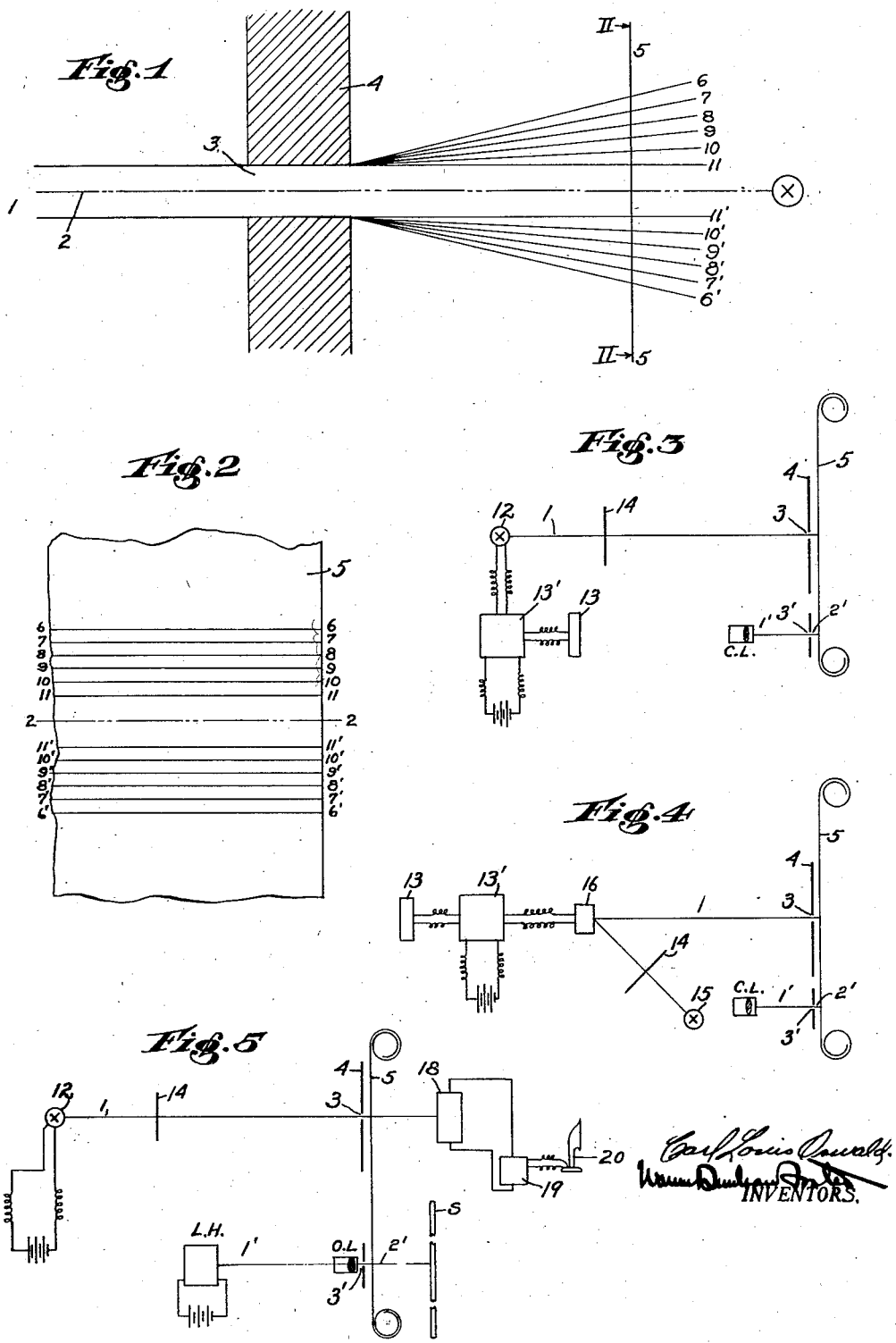

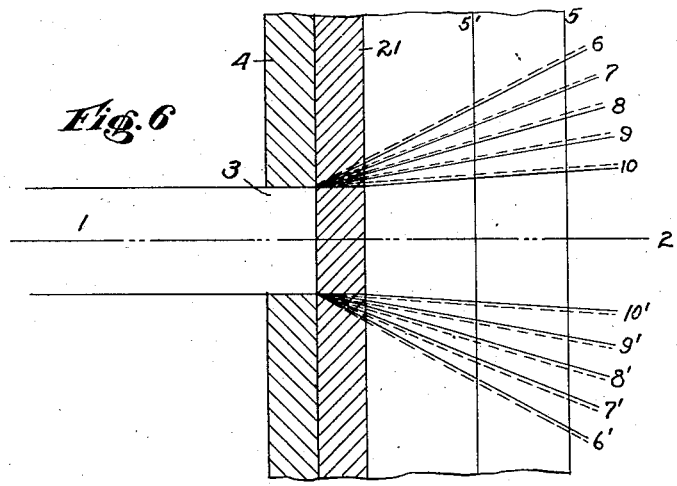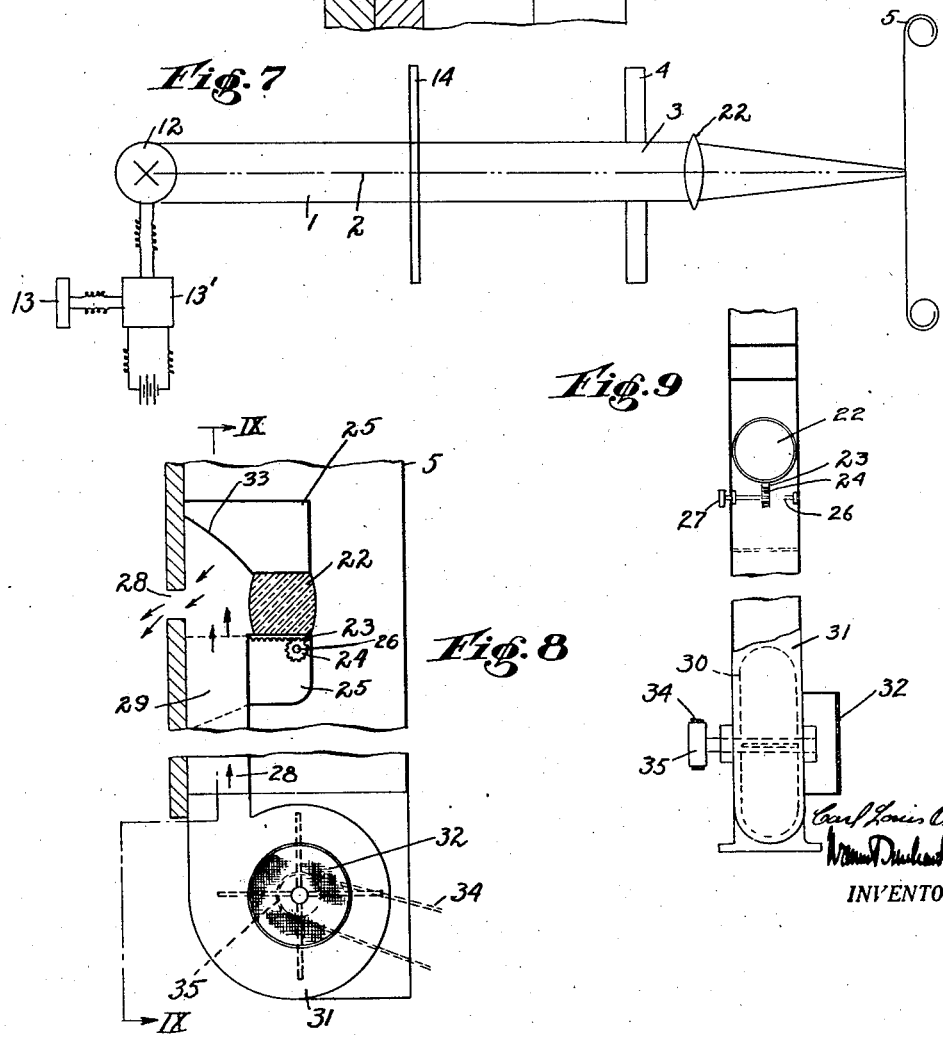

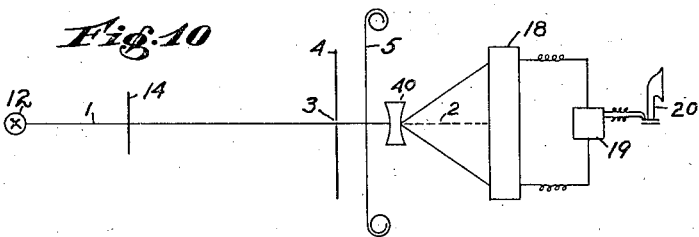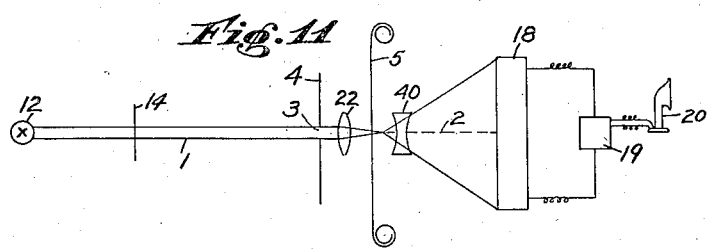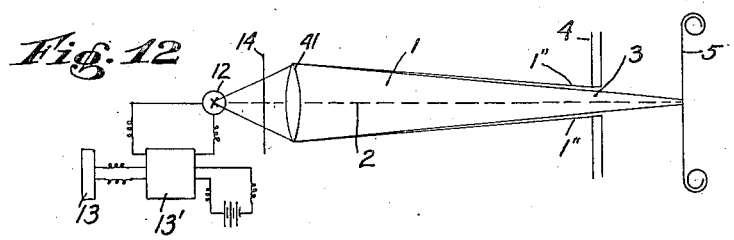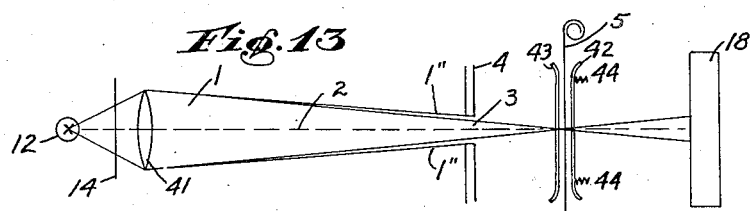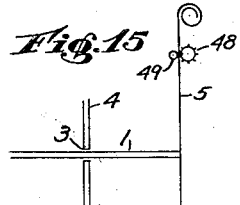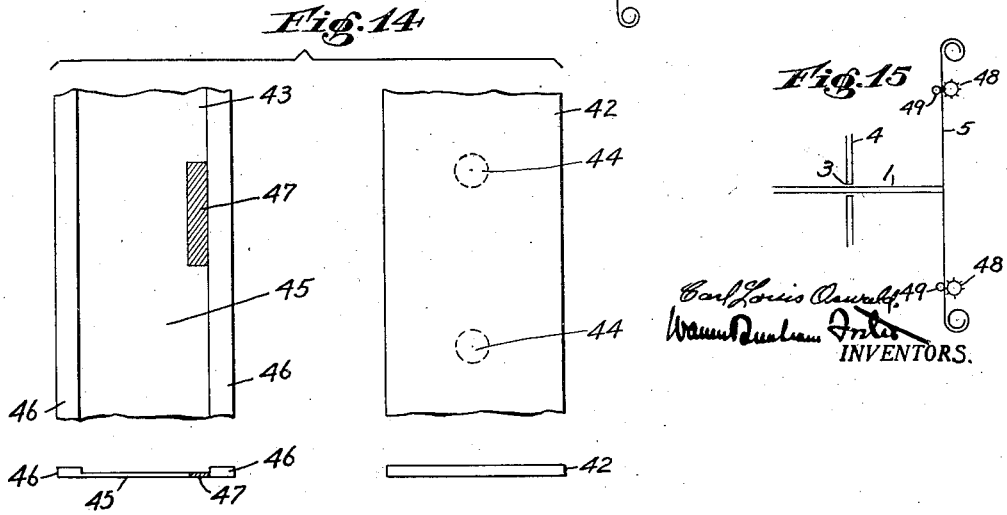

Sept. 26, 1933. C. L. OSWALD ET AL 1,928,392
RECORDATION AND REPRODUCTION OF SOUND AND THE
PROCESS THEREOF AND APPARATUS THEREFOR
Filed Oct. 29, 1928 6 Sheets-Sheet 5
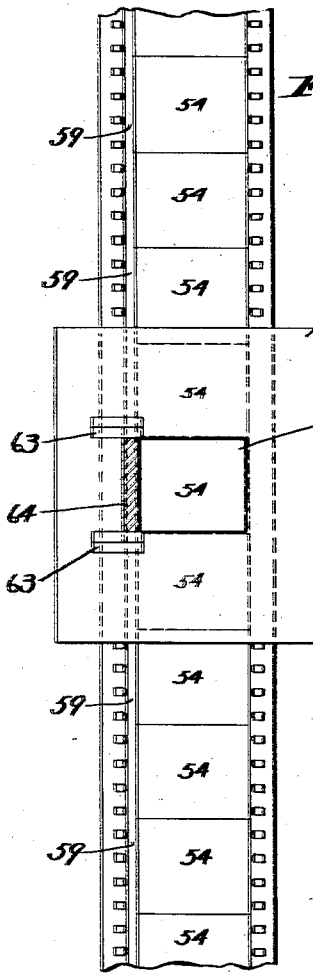
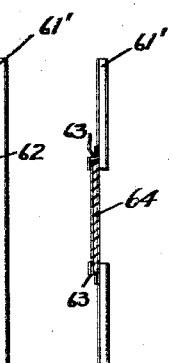
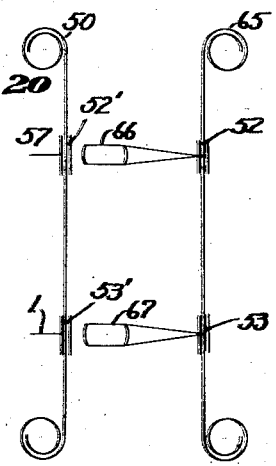
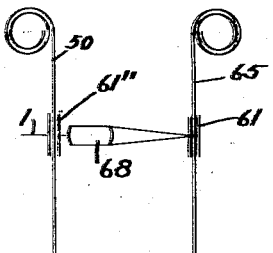
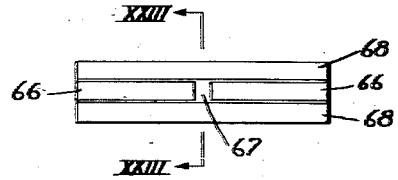
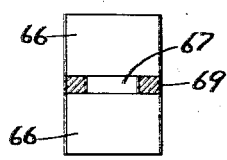

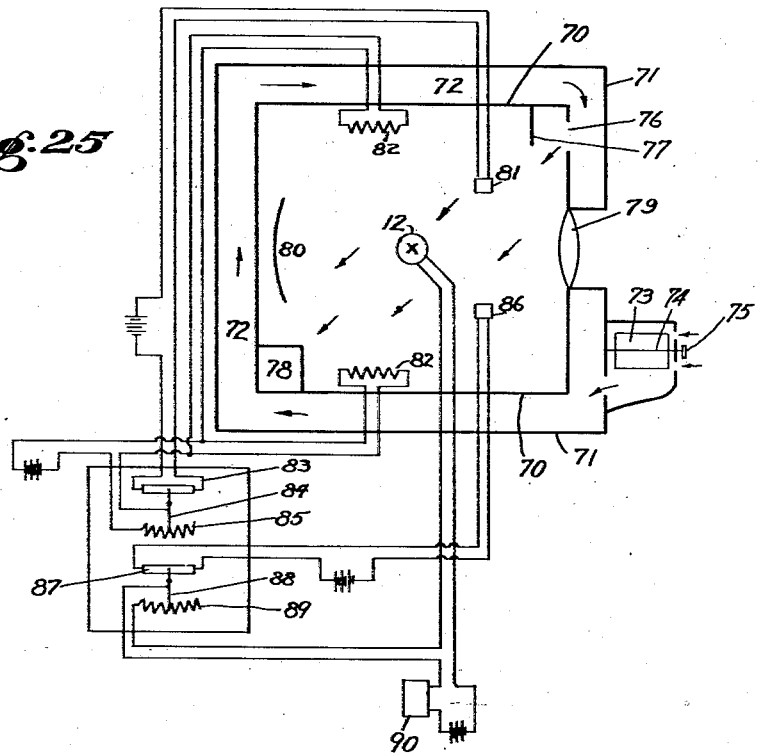

Patented Sept. 26, 1933

1,928,392

UNITED STATES PATENT OFFICE 1,928,392

RECORDATION AND REPRODUCTION OF SOUND AND THE PROCESS THEREOF AND APPARATUS THEREFOR

Carl Louis Oswald, New York, N. Y., and Warren Dunham Foster, Washington Township, Bergen County, N. J., assignors, by direct and mesne assignments, to Kinatome Patents Corporation, New York, N. Y., a corporation of New York Application October 29, 1928. Serial No. 315,761

53 Claims. (Cl. 179—100.3)

The present invention relates broadly to the art of recording sound upon light sensitive material and the reproduction of sound therefrom by photoelectrical means, but it will be readily understood that it may be applied to many other uses. Our invention is particularly applicable to so-called film-playing phonographs, both for recordation and reproduction, whether their films carry sound images alone or sound images in conjunction with visual images, as in the so-called "talking movies". Our invention also includes the method, and means for the production, of duplicate sound records, or positive prints from a master record or negative, whether or not such sound records are combined or to be combined upon the same film with pictures or used independently thereof or synchronously therewith.

A primary object of our invention is to secure the accurate and faithful translation of sound waves into photographic images and of photographic images into sound waves. We provide improved method and means whereby recorded sound may be reproduced more accurately and pleasurably than heretofore has been possible, either independently or in conjunction with pictures.

A related object is the photographing upon film from which sound is to be reproduced of lines or masses which are so clear and distinct, and of such uniform density, that sound waves reproduced from them will be clear, distinct and true. We also provide a method for the translation of these reproducing lines, masses or signals into audible sound waves, which reduces to a minimum any possibility of distortion or blurring.

In the past, attempts to secure such clear and uniform photographic images and to reproduce accurately the sound recorded thereby have led to the adoption of various expedients which in turn have led to difficulties. One common plan has been the use of a slot so narrow that only with difficulty can it be constructed with sufficient accuracy for practical efficiency. In many cases, the film has been fed in close physical contact with the medium containing the slot, thus rapidly filling the slot with dirt, dust, and portions of emulsion or cellulose from the film, and also putting an undue strain upon the film. While we provide a satisfactory means for the construction of a slot of extremely small width and for keeping it free from obstructions, in apparatus constructed according to preferred forms of our invention it is not necessary to provide a slot of such extreme narrowness or to run the film in actual contact with the material forming or covering the slot.

Under current practice, it has been thought necessary to restrict the area of the effective image formed by the sound which is being recorded or which is to be reproduced to the exact area of the slot through which the actuating light passes, thus creating obvious restrictions. In apparatus constructed according to a preferred form of our invention, the area of the effective image may be materially smaller than that of the slot, and in that made according to another preferred form it may be slightly larger.

Another object of our invention is to make possible the use of photographic images in lines or mass formations, representing sounds which it is desired to record or reproduce, which photographic images may be materially smaller than such as now are common in the art. We are able by such means to make use of many more sound images or tone symbols in a given length of film, greatly increasing its tonal time equivalent and range and consequently also greatly augmenting the effectiveness, in a given time period, of combined sound and picture reproduction. Moreover, our invention has particular usefulness in connection with motion picture and phonograph apparatus which employs films of 16 millimeters or 9 millimeters in width or of some other size primarily designed for home use and which are of less than the so-called theatrical standard of 35 millimeters width. Obviously upon such films, which, because of economy and other commercial conditions, are now well established for domestic use, the area which is available for the sound image is very much reduced. As a consequence the difficulties which have arisen from ill defined photographic images, representing sound impulses, when these are imprinted upon 35 millimeter film, have been greatly exaggerated when such images have been correspondingly reduced in size for use upon 16 millimeter or other so-called sub-standard film. Our invention makes it possible to secure upon 16 millimeter film, for example, as clear and accurate sound images as those which previously have been secured upon 35 millimeter film, and applies with corresponding effect to film of even smaller dimensions.

Under present practice, inaccurate and consequently unpleasant sound reproductions have resulted from undesired fluctuations in the theoretically constant light source of the recording apparatus, or of reproducing apparatus or printing apparatus. Our invention includes means for obviating such difficulties.

Another object of our invention is the reproduction of duplicate copies or prints of combined sound and picture films in which the picture record is printed in accordance with the photographic requirements of the picture and the sound record is printed in accordance with the photographic requirements of the sound record, thus making it possible in a single operation, for example, to print the pictorial portion very soft with a minimum of contrast and the sound portion very hard with a maximum of contrast. It will be readily understood that our method of printing may be applied in the duplication of the sound record alone.

Another object of our invention is to add to the electrical and acoustic means commonly employed in the recordation, duplication and reproduction of sound images certain photographic methods, means, and technique in such manner as to secure improvement in the quality of sound translation and retranslation. By the employment of the apparatus and the means and methods herein described, it is possible to assure the integrity of the latent sound image as of the moment at which it is implanted upon the photo-sensitive material.

A further object of our invention is the treatment of that latent image by such chemical and physical means, chosen with due regard to the means and methods which had been employed to implant the latent image and the characteristics of the particular photo-sensitive material employed, as will retain in the stable and completed sound image the quality imparted by such previous steps in the process.

Another object of our invention is to provide apparatus for the taking, projecting and printing of talking pictures or of films for film playing phonographs, which may be simply constructed and maintained.

Other objects, advantages and characteristics of our invention are apparent from the following description, the attached drawings and the subjoined claims. Although we are showing one preferred embodiment of each of the several phases of our invention, it will be readily understood that we are not limited to these particular constructions and processes as changes can be readily made without departing from the spirit of the invention or the scope of our broader claims.

It will be readily understood by those skilled in the art that our invention applies to sound apparatus generically, and equally well to that which is adapted for either the reproduction or recordation of sound or for the reproduction or printing of sound films, although for convenience and simplicity in certain parts of the following description and in certain of the claims we refer to the invention as embodied in recording apparatus or in reproducing apparatus or in printing apparatus. It will be readily understood that our invention may be applied to any art in which the accurate and controlled recordation or projection of a photographic image is useful or necessary in the exercise of control or translation by means of light.

In the drawings:

Figure 1 is a diagrammatic representation of diffraction occurring as light passes through an aperture, greatly exaggerated for the purposes of clarity.

Figure 2 is a diagrammatic section along the surface II—II of the film 5 of Figure 1.

Figure 3 is a diagrammatic view of one form of our invention as embodied in a sound recording instrument.

Figure 4 is a diagrammatic view of one form of our invention as embodied in a sound recording instrument of a type different from that represented by Figure 3.

Figure 5 is a diagrammatic representation of one form of our invention as applied to a reproducing instrument.

Figure 6 illustrates, in a form exaggerated for clarity, the effects of refraction and diffraction in connection with a slot and a glass or other cover therefor.

Figure 7 is a diagrammatic representation of the application of one form of our invention, including an optical element, to a recording apparatus.

Figure 8 shows one means for cleaning the slot.

Figure 9 is a section on the line IX—IX of Figure 8.

Figure 10 is a diagrammatic representation of one application of one form of our invention, including an optical element, to a reproducing apparatus.

Figure 11 is a diagrammatic representation of one of our applications of optical elements to a reproducing apparatus.

Figure 12 is a diagrammatic representation of our use of converging light in a recording apparatus. Figure 13 is a corresponding diagram of one form of our invention as applied to a reproducing instrument.

Figure 14 shows one form of film gate as employed by us, and Figure 15 shows a substitute therefrom.

Figure 16 shows our invention applied to a film printing machine with separate gates for the pictorial and sound images, severally. Figure 17 is a diagrammatic representation of the aperture plates of such gates.

Figure 18 shows a printer with a common gate, for both series of images, used in the practice of our invention. Figure 19 is a diagrammatic representation of the aperture plate and filter which we use in such a gate.

Figure 20 shows our invention applied to an optical reduction printer with separate gates, and Figure 21 to a similar printer with a common gate.

Figures 22, 23 and 24 show details of our slot structure. Figure 23 is a section on the line XXIII—XXIII of Figure 22.

Figure 25 shows means employed by us to maintain a light source at a constant temperature and point of incandescence.

Throughout the drawings and specifications, like characters apply to like parts. For the purpose of greater simplicity, like parts which are duplicated in various embodiments of our invention receive the same reference numerals except where clarity demands otherwise.

In carrying out our invention, we employ light of a predetermined wave length. We select light of that particular rate of vibration which has the photographic qualities which are desirable for the particular result which is to be obtained. For example, when we select light from the visible spectrum, we employ monochromatic light of a selected color or wave length, for the recordation, duplication or reproduction of the photographic image representing the sound waves.

From among the many photographic emulsions which are available, we are not compelled to choose in accordance with the limiting requirements of white light but are enabled to use in each employment of our invention the photographic emulsion which is best suited to the requirements of the particular conditions then applying and to employ in each instance that particular form of light which will be best suited to the particular emulsion deemed most suitable.

We select the developer for the latent image so implanted upon the selected emulsion by use of light of a selected wave length with due regard both to the particular characteristics of the particular emulsion and its reactions to the selected wave length and also to the peculiar demands of that portion of the film bearing the pictorial image as well as of that portion of the film bearing the sound image, in case both images are implanted upon the same strip. Thus it will be seen that we choose that particular combination of light, emulsion, and developer which will result in the most satisfactory sound and pictorial images under the given conditions.

In present common practice, polychromatic light, ordinarily spoken of as white light, is employed in apparatus using visible light for the electrical recordation and reproduction of sound and for the duplication or printing of the films so recorded. Even with the use of a better photographic technique than is now common, polychromatic light would still cause many of the difficulties to which reference has already been had and will later be made.

For purposes entirely different from those embraced within or pertinent to our invention, it has been proposed to employ visible colored images for use as sound records. We do not use colored images as part of or in carrying out our invention of sound recordation and reproduction. We use what is ordinarily known as a colored light, but the latent images produced thereby, when rendered stable and visible by development, are what are known as black and white. They have none of the characteristics, requirements or purposes of colored images or photography. It will therefore be understood by those skilled in the art, that our invention does not require the use of the special and expensive films and apparatus, which have been proposed to be used for purposes different from our own, nor are we limited by the many photographic and practical difficulties associated with the use of so-called colored films.

When reference in this specification or in the claims which are a part hereof is made to "black-and-white" films, it is understood that such terminology is used with the meaning common in the motion picture art. Such "black-and-white" films may be colored by tinting or toning or any other similar process, whether carried on as supplementary to the regular development and fixing or otherwise. Moreover, the term may be used to include films which are made upon a base which is colored or tinted, provided the emulsion used thereon is one of those ordinarily associated with the making of black-and-white images if used with an ordinary white or gray base.

It will be noted in the subjoined claims that the step of moving the film, or means for moving the film, is not in all cases specifically included, although, as well known to those skilled in the art, and as is stated herein, sound is ordinarily recorded upon, printed upon, and reproduced from, a moving film. Such omission in the claims of an obvious step or means is to avoid encumbering the claims with unnecessary words, since, wherever necessary, the inclusion of this obvious step or means will be understood.

The processes of the electrical recordation of sound upon a photographic film or similar light sensitive surface are of course well understood. The film or other light sensitive material is moved continuously at a uniform speed and upon it, generally through a slot, a light is projected, varying in accordance with the amplitude of the sound waves which are being recorded. Thus there is imprinted upon the light sensitive surface a series of images the photographic density of which varies in accordance with the variations of the sounds which are being recorded. The resulting images may appear to the eye to be a series of lines of varying intensity. These lines in the negative indicate by means of greater density the nodes of the sound waves and by less density the anodes of the sound waves, or, in case of the use of photo-electric cells of a certain less usual type to control the fluctuation of the light, the reverse is true.

As a matter of convenience, it is to the above-indicated method of sound recordation that reference will most often be made. It will be readily understood, however, that our invention is equally applicable to any form of sound recordation which depends upon the implantation of photographic images upon a light sensitive material, whether, for example, such images take the form described above or that of continuous masses of varying density or of continuous or broken lines or masses which rise and fall relative to the lengthwise edge of the film.

Similarly it will be understood that the reproduction of photographically created sound records of any type depends upon the passage of light therethrough and its impingement upon material the resistance of which to an electrical current varies in accordance with the light thrown thereupon, this electrical current telephonically creating sound waves. Consequently any lack of exactitude in the translation of the sound image into the photographic image will be reproduced in the translation of the photographic image back into the sound image, together with whatever additional inaccuracy or lack of clarity may exist because of the imperfections of this process of re-translation.

Polychromatic light, the use of which our invention eliminates, causes much of this inexactitude and many of these imperfections.

Figure 1 illustrates in a much exaggerated form the edge diffraction which is caused by passing polychromatic light through a narrow slot of the type commonly used in the art. The degree of diffraction which results from passing white light over an edge is directly proportioned to the lengths of the several waves which make up the light. Thus the rays of the longer wave lengths are diffracted to a greater extent than are those which are of lesser amplitude. In Figure 1, 1 represents a beam of polychromatic light of which 2 is the axis.

In this and many of the following drawings, for convenience we show the light as a straight line such as 1. It will be understood that, except as definitely stated, we do not limit ourselves to an optical system of any particular nature. The light may be projected, by any suitable optical system, in the form of parallel, divergent or convergent light. If desired, a mirror or other reflecting element, not shown, may be employed behind the light source. This light in passing through the opening 3 in the aperture plate 4 is diffracted in accordance with the wave lengths of its component parts. Thus the infrared rays 6 and 6' show the maximum diffraction, the visible red rays 7 and 7' the next largest degree of diffraction, the yellow rays 8 and 8' a lesser diffraction, the blue rays 9 and 9' the least amount of diffraction of the visible rays and the ultra violet rays 10 and 10' the least diffraction, the degree of diffraction of the sub-primary colors not being shown.

As these rays of varying wave lengths fall upon the film 5, as is well illustrated in Figure 2 of the drawings, there are transverse bands of the light sensitive emulsion which are subjected to rays of different colors. Every light sensitive emulsion has varying degrees of sensitivity to different colors. As a result of such varying sensitivity, while the entire portion of the emulsion between the lines 11 and 11' is acted upon with approximate uniformity by the white light, the bands from 10 and 10' to 6 and 6', both inclusive, are acted upon in degrees varying according to the sensitivity to color of the particular photographic emulsion which is being used at the time. As a result the portions of the entire line or mass which lie between 11 and 6 and 11' and 6' respectively are lacking in uniform photographic density, the portion between 11 and 11' being more nearly uniform. In other words, the edge is not clear and straight. It is in effect ragged and "muddy". As a result, when a photographic image which is bounded by such an edge is used to actuate a photo-electric cell in the reproduction of sound what the auditor hears is likewise unclear, "muddy" and blurred. It will be readily recognized that any blurring of a photographic image caused by such diffraction will result in a corresponding blurring of the sound which is reproduced therefrom.

We have found that much of the difficulty in the past blamed generally upon "diffusion", "diffraction", and even photographic "grain", is in reality due to the lack of a correct photographic definition caused by fringing colors, which in turn are the result of diffraction as stated above.

It will be readily understood that the more narrowly the slot is restricted in size, the more pronounced will be such imperfections.

In Figure 3 we show diagrammatically one embodiment of our invention applicable to a sound recording system such, for example, as one which employs an immovable light supplied by an electric current varying in accordance with the amplitude of the sound waves to which a diaphragm is subjected.

In Figure 3, the intensity of the light at source 12 in operation is constantly varied in accordance with the amplitude of the sound waves which are being recorded. Any one of the many well known devices to accomplish such purpose may be employed, as for example a microphone 13 connected with any suitable type of current controlling device indicated generically as 13'. Since the method of controlling the variations of the light source 12 in accordance with the sound waves is well known and forms no part of the present invention, it is neither described nor claimed.

The light 1 emitted by source 12, we pass through an appropriate color filter 14, the slot 3 in the aperture plate 4 and on to the film 5. Since the optical system, and the method of feeding the film form no part of the present invention and since any of several well known optical systems and film feeding methods may be employed, we do not describe or claim them.

The exact filter to be used will depend upon the photographic characteristics of the emulsion selected. It will be readily understood that with the use of any monochromatic light all of the area of the film which is exposed or illuminated at the same instant will be of practically uniform density. For example, if we elect to employ light of approximately 4000 Aengstrom units, we will use a filter 14 adapted to prevent the passage of all light other than such as will register between 9 and 9', inclusive, as shown in Figures 1 and 2. The image so created upon the film will have sharp demarcation along the lines separating band 9 from band 8 and band 9' from band 8'. That is, each illuminated or exposed area will be clearly and sharply defined and its so-called photographic contrast great. Irrespective of the type of monochromatic light employed, the sharpness of differentiation or contrast will be increased over such as obtained with polychromatic light and the "raggedness" caused by the use of such light largely eliminated. It should be noted, however, that the relative excellence of the result will depend upon the selection of the wave length particularly appropriate to the photographic emulsion selected. In recent practice, in order to overcome difficulties caused by the so-called "grain" of the emulsion, relatively slow emulsions, such as, for example, those of 120 according to the rating of Hurter and Driffield, have been recommended for sound films. By the use of photographically active wave lengths, such as for example those in the vicinity of 4000 Aengstrom units, we secure with such a slow emulsion in a relatively short period of exposure the same results as others secure in a much longer and hence impractical period of exposure.

It will be understood that instead of using rays of one wave length only, we may employ rays of a group of related wave lengths.

In carrying out our invention we may simultaneously record the images representing sound upon the same film as that upon which the images representing action are recorded. Or we may make records of each series of images upon different films and subsequently impose the images representing sound upon an unoccupied portion of the film bearing the original images representing action. Or we may make separate record or negative films for the sound and action images and duplicate both such series of images upon different portions of one positive film.

If we use a common record or negative film for both sound and action images, as is shown for purposes of illustration in Figures 3 and 4 of the drawings, we may provide a camera lens C L through which light 1' from the action or scene being recorded is focused (its axis being represented as $2^1$) through the aperture $3^1$ upon the film 5. It will, of course, be understood that a certain portion of the film is reserved for the action images and another separate portion for the sound images, the respective apertures $3^1$ and 3 being so designed as to direct the light of axes 2 and $2^1$ upon the appropriate portions of the film.

In those cases in which the sound and pictorial records are placed upon the same film, we may prefer to use an emulsion rated at between 120 and 200 according to the scale of Hurter and Driffield. An emulsion of a speed of 180 upon that rating may be taken for purposes of illustration.

For an emulsion of such a speed, with the latent image of the sound record produced by monochromatic light, as for example that of approximately 4000 Aengstrom units, and the pictorial portion produced by polychromatic light, we prefer to use glycin, known as gamma oxyphenyl or as gamma oxyphenyl-amido-acetic acid, as the developing agency. Under such conditions, glycin will produce the necessary contrast in the sound image and at the same time build up the half tones of the action image. It will be readily understood by those skilled in the art that for pleasing results in reproduction the sound images require great contrast and the action images full gradation. If, however, polychromatic light is used for the sound images, the glycin development would tend to reduce the contrast in the sound images to a point which will result in unsatisfactory reproduction. If a hydrochinone developer is used, the sound image made with light of a wave length of 4000 Aengstrom units would be satisfactory but the pictorial image, which is of course always recorded by polychromatic light, would be unpleasantly harsh. If a hydrochinone developer is used with a sound image made by polychromatic light, a period of development is necessary in order to secure proper contrast in the sound image which will still further increase the unpleasant harshness of the pictorial image.

The use of glycin is desirable also because it tends to reduce the grain. As is well known in the art, a slow emulsion has less grain than a more rapid one. Hence we prefer to use as slow an emulsion as is consistent with the demands of the pictorial image. Only with the use of monochromatic light is it possible to secure, in a way practical in sound recordation and reproduction, the use of both of these factors, namely a relatively slow emulsion and glycin development, which tend to eliminate the difficulty caused by grain.

In glycin development, the following stock solution may be prepared:

Water, $H_2O$ _____ 32 ounces
Sodium sulphite, $Na_2SO_3$, anhydrous_ 360 grains
Glycin, $C_6H_4OHNHCH_2COOH$ _____ 120 grains
Sodium carbonate, $Na_2CO_3$, anhydrous _____ 360 grains The chemicals should be dissolved in the above order. The water should preferably be of a Fahrenheit temperature between 100 and 120 degrees.

For use with the emulsions of the speed stated above, such stock solution may be diluted at the ratio of one part stock solution to three parts water. The film may be developed for thirty minutes, preferably at about 65 degrees Fahrenheit. After such development, the usual steps of washing, fixing, and final washing may be taken.

We prefer to keep the film totally immersed during the entire period of development in order to minimize oxidation fog. We have found that the elimination of such fog is an important item in securing clear and sharp sound images. Glycin is a developer which produces a minimum of such fog, but to prevent the possible formation of such fog, we may prefer to use a bath of pinakryptol green, in a dilution of one part to five thousand parts of water, before the development as by the use of glycin.

In those cases in which the sound images are to be recorded alone, without pictorial images upon the same film, we may prefer an emulsion rated on the Hurter and Driffield scale between 20 and 120. Excellent results may be obtained with an emulsion of such a speed of 40 for example. With any such slow emulsion, with no latent pictorial image thereon, we may use any so-called contrast developer, such as hydrochinone, such as commonly known and used in the photo-engraving art.

It will be understood that we do not restrict ourselves to the particular formulæ, methods, chemicals, or emulsion speeds stated above, but that we state the same for purposes of illustration.

For purposes of further illustration, it may be assumed that we wish to make a combined sound and pictorial record of waves breaking upon the shore of the sea. In order that we may secure full color and gradation values, we may prefer to use an emulsion having the color sensitivity commonly known as panchromatic together with a filter for the pictorial portion of the film. Such a filter may be of a yellow color and of the type commonly known in the photographic art as K3. For the sound image, we may prefer to use a light of approximately 4000 Aengstrom units because such a light, in combination with a panchromatic emulsion, produces great contrast. The polychromatic light, modified as is well known in the art by the K3 filter, produces an image which is soft and pleasing. Glycin development of such a film gives satisfactory results in both portions. In this case, however, with the use of panchromatic film, we may prefer to use a preliminary bath of pinakryptol green diluted at the ratio of one part to four thousand parts of water.

For the purpose of still further illustration, it may be assumed that it is desired to produce a combined sound and pictorial film under conditions which require a fast emulsion. The action to be recorded, for example, may be rapid or light conditions poor and not subject to control as in a studio. An emulsion of a speed on the Hurter and Driffield scale of over 450 may be chosen. Under such conditions, a monochromatic light of 4000 Aengstrom units may be too rapid in its action. In such cases, we prefer to use for the sound recordation a filter which will transmit light of a suitable wave length or group of wave lengths as, for example, any wave length or group of wave lengths between 4500 to 5800 Aengstrom units, depending upon the particular emulsion employed. Thus we are enabled to give to the operator definite filters for use with definite emulsions, rather than depending upon adjustments in the field of the light source for the sound record.

It has been proposed in the past to make use of special emulsions which, after the images implanted thereon have been developed and rendered visible, have peculiar characteristics of permeability by or absorption of light waves of particular wave lengths in combination with the photo-electric cell of particular characteristics in a sound reproducing instrument. It will be understood that we use regular stock photographic films known as black-and-white, which can be readily and cheaply obtained throughout the world, choosing such films, however, in accordance with the purely photographic characteristics thereof which are useful for the particular purpose set forth in this specification. Our choice of an emulsion of a particular speed is conditioned by the photographic characteristics of the latent images which can be implanted thereon by the use of light of a particular wave length, and the photographic characteristics of the visible and stable images which can be developed from such latent images. Although our invention can be applied to those types of apparatus in which separate films are employed for the sound and pictorial records, it is also equally applicable to those types of apparatus in which one film is used to carry both such records. It will be readily understood that such a single film bearing both such records must be chosen, exposed, developed, duplicated and projected in accordance with all the requirements of both such records. As is made clear throughout this specification, our method is so adapted to use with a single film which bears both types of records thereupon.

Figure 4 represents diagrammatically the application of our invention to a sound recording device which depends upon a movable mirror of the so-called "galvanometer", Pallophotophone, or Hoxie type. A light source 15 of fixed intensity is provided, the light from which passes through a color filter 14 and impinges upon a movable mirror 16 the light rays from which pass through the slot 3 in the aperture plate 4 and impinge upon the film 5, in this case creating images which take the form of a wave line and create an oscillograph. The movement of the mirror 16 is actuated through the control device $13^1$ and the microphone 13, which, being well known in the art, are indicated merely for purposes of illustration, it being understood that they form no part of the present invention.

Figure 5 diagrammatically shows our invention as applied to the reproduction of sound. The light 1 from a constant light source 12 passes through the appropriate color filter 14, the slot 3 of the aperture plate 4 and the film 5, and impinges upon the photo-electric cell 18 or its equivalent, which actuates the sound producing device 20 through the control element 19. Since the optical system, the method of film feeding, the light sensitive electrical element and the sound producing device and its control form no part of the present invention and are well known in the art, they are not further described or claimed.

The same considerations apply to the effect of light upon light sensitive electrical elements as upon the light sensitive emulsions. Mixed or polychromatic light impinging upon a photoelectric cell causes variable and untrue sound reproduction, since the photo-electric cell is differently responsive to each color. The results obtained by our use of monochromatic light for translation of light into sound are analogous to or the same as those described above for the translation of sound into light.

Another factor improving reproduction and recordation renders the use of monochromatic light for sound translation superior to any means heretofore employed. As is well known in the art, the sensitivity of photo-electrical elements commonly varies both in accordance with the color of light and its intensity. Thus any change in voltage or temperature of the theoretically constant light source 12 may cause a color change as well as an intensity change, vary "white" light to yellow or in some cases even blue. The photo-electrical element is affected by such change in color as well as by the reduction in intensity. Later we describe means for removing one cause of change in color but it is obvious that better results are obtained by the removal by the use of monochromatic light of one of the variants so described.

It will be understood that such use of monochromatic light will be particularly desirable for the constant light source 15 of the recording instrument as shown in Figure 4 or any and all other apparatus designed to accomplish results similar to those of the forms shown in Figure 4.

As has previously been stated we may employ for reproduction a single so-called positive film upon one portion of which there are visible images representing sound and upon another portion of which there are visible images representing action. For purposes of illustration only, the projection of such a pictorial record from the same film which bears the sound record is shown in Figure 5 of the drawings. From a lamp house L H a beam of light the axis of which is shown as $2^1$ may be projected through the objective lens OL the aperture $3^1$ and upon the screen S, as is well known in the motion picture art.

In recording and reproducing devices as heretofore known, which have used polychromatic light, the slot often has been constructed as narrow as possible and placed in contact with the moving film or separated from it by a thin cover of glass in an attempt to restrict the image recorded or projected and thus overcome in some measure the results of difficulties stated above.

It has been extremely difficult to construct such slots, say those of a width of fifteen ten thousandths of an inch, or less, with sufficient accuracy, and, when constructed, to keep them free from particles of dust, dirt, emulsion, and celluloid brought to them and deposited by the moving film. When cover glasses for the slot have been used with polychromatic light, difficulties caused by the varying degrees of refraction of the component parts of white light have been added to those caused, as stated above, by the different degrees of diffraction.

It will be readily seen that by the use of our invention it is possible to employ a slot somewhat larger in size than has been common and free from contact with the film, since although the actual area of exposure, or of exposed area to be projected for reproduction, may be somewhat larger than in the past, all of this area is effective for the true recordation or reproduction of the image which represents the sound, none of the same being obscured in the twilight zone of fringing colors and impairing the quality of tone reproductions. Moreover, by the use of rays of the shorter wave lengths, such as shown as falling between 8 and $8^1$, 9 and $9^1$, and 10 and $10^1$, in Figures 1 and 2, it is entirely possible to eliminate sufficient width of the area of exposure to compensate in part for the small fraction of an inch which the slot is removed from the film and its slightly larger width, and that without the employment of other means hereafter described. Generally speaking, however, owing to the edge diffraction of rays of any length, the image recorded or reproduced, from the larger slot so spaced, with the one of parallel or divergent light, will be slightly greater than the area of the slot.

It will be understood, also, that under our invention cover glasses can be employed without the disadvantages arising from the different refractive characteristics of the component parts of polychromatic light.

This phase of our invention is indicated in Figure 6 in a form much exaggerated. 21 is a glass cover for the slot 3 cemented to the aperture plate 4. With the use of polychromatic light, only those portions of the film lying between 10 and 10' will receive or project an image without "muddiness" due to color aberration caused by diffraction and complicated by refraction.

By reason of the impinging of light of varying photographic effectiveness due to varying colors, along the edges of the normally exposed line or mass upon the film, various aberrations occur in the resulting record film. These aberrations, accentuated by like aberrations originating in the reproducing apparatus, result in an incorrect reproduction of the originally recorded sound. As is well known, glass or other similar surface 21 will refract all rays which strike it save those which are at right angles to its plane. Upon emergence, these refracted rays will resume a course parallel to their normal course. In Figure 6, the dotted lines show the course which for purposes of illustration it is assumed these rays would take were it not for the refraction caused by the introduction of a substance such as 21. The refraction caused by 21, however, causes them to take the courses illustrated by the solid lines. The boundaries between each color zone diverge as before, but these boundaries are brought nearer to the optical axis 2 thus reducing the zone 10 to 10' which represents the area free from color aberration. Ultra violet rays do not pass the glass 21, but if quartz were used, for example, the refraction would be similar in kind although different in degree to the refraction of visible rays as described above.

With the use of monochromatic light, however, says of 4000 Aengstrom units, for purposes of illustration, the image will be restricted to the area lying between 9 and 9' and all of it will be true because of uniform density. Thus the film in position 5 of Figure 6 with monochromatic light will receive or project an image, all of which is effective and true, which is not greatly if any enlarged over that of the image of the film in polychromatic light in position 5', much of such latter image being ineffective and untrue.

Whatever difficulty, if any, is encountered in connection with refraction or diffraction of light caused by its passage through the sound record itself will be measurably minimized by the use of monochromatic light.

Other preferred embodiments of our invention, however, make it possible to use a relatively large slot, run the film out of contact with it, and photograph or project an image which is relatively very much smaller than the area of the slot. We accomplish this result either with or without the introduction of optical elements, and with the use of light of a selected wave length or group of wave lengths.

According to one of these embodiments of our invention, as is clearly shown in Figures 7, 8 and 9 of the drawings, we introduce a suitable optical element 22, such as for example a positive lens of the type generally known in the optical art as "apochromatic", between the slot 3 and the light sensitive surface 5. We project light from the source 12, varied as previously set forth by the control element 13' from the microphone 13, or in any other suitable manner, through the filter 14, which may be chosen at will by the operator to suit the particular photographic requirements involved, through the slot 3 in the aperture plate 4 and through the lens 22 or other suitable optical element, upon the light sensitive surface 5. Thus by the use of monochromatic light we project an image of the slot which is in no way affected by the aberrations common to white light and which is therefore reproduced upon the photo sensitive surface 5 without loss of integrity. As is well known in the optical art, the side of the image projected upon the light sensitive surface can easily be controlled by the selection of a lens of the focus suited to the mechanical requirements and by focussing the image with this lens, according to the well known law of conjugate foci. As is well shown in Figures 8 and 9, we may mount the optical element 22 in any suitable manner as upon the supports 25. We may provide a rack 23 attached to the optical element whereby through a pinion 24, a rod 26 and a knob 27, the operator can vary the focus at will. Thus, by use of monochromatic light, it is possible to create upon the photosensitive material a satisfactory slot image appreciably smaller than the slot from which it is projected. By the employment of such means it is apparent that the photographic intensity of the light 1 delivered upon the film 5 may be limited to a larger or smaller area as may be found desirable in the recordation of any desired sound upon the film 5. It is apparent that the intensity of the light at any given point will be increased at the surface of the film as the area of the image is decreased and the rapidity of the photographic action of the beam of light will be increased accordingly. It is likewise apparent that the recordation of the images so produced upon the film 5 through the optical element 22 may be made to vary in type limited only by the capacity of the emulsion employed to receive and record light effects upon minute areas of light sensitive substances.

It is apparent that the ability so to record tonal variations in very great detail and almost microscopic size will render possible a vastly increased range of tonal recordation and reproduction and likewise a notable improvement in the detail of recorded and reproduced sound.

It is also apparent that the increased intensity of light available for delivery at the surface of the film 5 through the means described will render possible the use of whatever less photographically active rays of light and photographically slower emulsions which may be deemed desirable because of the so-called "grain" or other photographic difficulties, all of which above advantages, methods and means are such as will be fully known to and understood by those skilled in the art without further description or explanation in detail.

The slot 3 may be constructed under our invention sufficiently large so that accuracy of manufacture is possible without undue cost and so that it can be kept clean.

According to one embodiment, as is clearly shown in Figures 8 and 9, of our invention, the slot may be kept clean by the provision of a draft of air indicated in Figure 8 by the arrows 28, forced upwardly through a tunnel 29 by a fan 30 fixed in a housing 31, the entrance thereto being suitably protected by dust-retarding material 32. A baffle plate 33, which may be preferably constructed as a portion of the mount 25 of the lens 22, is so placed as to deflect the air current downwardly, as shown by the arrows 28 in Figure 8, through the slot 3. Power to operate the fan may be applied from the motive power of the film feeding apparatus, not shown, through the belt 34 to the pulley 35.

It will be readily understood that this embodiment of our invention can be applied with equal facility to recording, reproducing or duplicating apparatus.

Our invention also includes similar and related means applied to reproducing apparatus. According to this phase of our invention, the angle of divergence of the light-beam after it has passed through the image bearing material is increased, so that a relatively large area of the light-sensitive current-carrying material of the photo-electric cell is exposed to such light, thus, as is well known in the art, much improving the quality of the resulting sound reproduction. In the past, reliance for a suitable illumination of the photo-electric cell has been placed upon the divergence of the rays after they pass from a converging condensing lens through their focal point, at about which point they pass through the film. The optical exigencies of this and other similar systems obviously have made it necessary to narrow the slot to the uttermost and to place film and slot as close to each other as is possible.

One form of this embodiment of our invention is well shown in Figure 10. Light from the constant source 12 is passed through a suitable color screen 14 and the slot 3 of the aperture plate 4 and through the film 5 bearing the sound symbols and impinges upon the optical element 40 and upon the photo-electric material 18 or other device which through some suitable means such as the control box 19 and the amplifier 20 translates light waves into sound waves. The optical element 40 may be a negative lens or other suitable optical device for increasing the angle of the divergence of the light 1 from its optical axis 2, and hence the extent of the area of the photo-sensitive material 18 upon which the light impinges. Under current practice such an expedient would not be effective owing to the practical impossibility of securing at a cost within commercial conditions an optical element sufficiently achromatic to remove enough of the color aberration of white light so that the operation of the photo electrical material should not be interfered with and rendered "muddy" by the impingement upon it of light of varying colors. With the use of monochromatic light, however, all difficulties due to color aberration disappear and it is entirely practicable to secure accurate translation in this manner.

Another preferred embodiment of our invention is a reproducing instrument, as is clearly shown in Figure 11, which employs two sets of optical elements in immediate cooperation with the film, the first to increase the convergence of the light upon the film (as has been described above for a recording instrument) and the second for increasing its divergence as just set forth.

The light 12 passes through the filter 14 and the slot 3 and by means of the optical element 22 is caused to converge upon the film 5; after the light has passed through the film, it passes through the optical element 40 and is made to diverge so that a relatively large area of the photo-electric element 18 or its equivalent is exposed to the light, with results as stated above. Thus it will be noted that the area upon the film of the sound record which is exposed to the light may be made very much smaller than the area of the slot and that the area of the photo-electrical element so exposed may be made very much larger than the area of either the slot or the photographic image upon the film.

Another embodiment of our invention makes it possible to secure many of the results above set forth, but without the use of special optical elements.

Thus, as set forth above and illustrated in Figure 12, in a recording apparatus, we may provide a variable light source 12, actuated by the control element 13' or like means and the microphone 13. Such variable light passes through the filter 14 and is condensed by the lens 41 of any suitable design. A mirror, not shown, may be provided if desired, as is well known in the art. The converging light 1 passes through the opening 3 in the plate 4 and, at or about its focal point, impinges upon the film 5. The slot 3 may be made somewhat smaller than the cone or wedge of light which it is desired to use for exposing the film 5 so that stray rays, illustrated in Figure 12 as 1'', may be arrested.

For a reproducing instrument, as is clearly illustrated in Figure 13, we may provide a light source 12 which sends a beam through a filter 14, a condensing lens 41 and a slot 3 in the plate 4, the converging rays passing onwardly and to the film 5 which is held between the gate sections 42 and 43. This light continues onwardly and impinges upon the photo-electrical cell 18 or its equivalent. It is sometimes desirable to make the slot 3 of somewhat less area than the theoretical area of the cone of light so that any stray rays illustrated as 1'' will be cut off by the solid portion of the plate 4 and will not reach the film 5.

As is illustrated more in detail in Figure 14, one preferred form of gate for films carrying sound records may consist of two transparent plates with no physical aperture whatsoever. In the gate shown in section 43, the portion 45 along which the image bearing portion of the emulsion-bearing side of the film travels, is slightly relieved, as is common in the motion picture art, the edges of the film bearing upon the raised portions 46 and the section 42 which bears against the film opposite to section 43 is completely flat and is held in position by springs 44 as is well understood in the art. When we make use of a monochromatic visible ray, the portion 47 of the plate 43 which is opposite the sound image carrying portion of the film is left transparent, but the remainder, left without cross markings in Figure 14, which is opposite the pictorial portion of the film and its edges, is silvered.

Since it is inherently strong, it is available in thin sheets, and for still further reasons which will be later apparent, the plates 42 and 43 may well be made of plane quartz although we have found glass practicable. It will be readily understood that since there is no aperture or slot across which the film travels, the problem of dust and dirt is met.

In the various exemplifications of our invention which have been set forth, the gate structure above described may be used, or any other suitable gate may be employed. In recording instruments making use of visible rays, the back plate 42 of the above gate may also be silvered. With the use of monochromatic light, however, as is illustrated in Figure 15, it is not always necessary to use a film gate of any kind for the exposure or projection of the portion of the film bearing the sound symbols.

As is shown in Figure 15, the film 5 is fed continuously and positively as with positive engagement between its perforations and continuously rotating sprocket wheels 48 and their idlers 49. The sprockets 48 and their idlers 49 hold the film reasonably flat. Unless the film is very old and shrunken so that it tends to curl at the edges, these two sprocket wheels hold it sufficiently flat at the point at which the light strikes it so that a minimum of sound distortion is caused by a distortion of the light waves caused by the film being out of plane. Much of the difficulty which under present practice is attributed to this lack of proper plane evidently is due to the variations in refrangibility of the several wave lengths composing white or polychromatic light.

Figures 16 to 20 inclusive illustrate diagrammatically the application of our invention to printing or duplicating apparatus.

The negative film 50 and the positive film 51 may be fed in any manner well known in the art as through the two separate printing apertures 52 and 53. The portion of the film which bears the pictorial representation 54 is exposed in the usual manner in the gate 52. The intensity of the light source 55 is varied in any well known manner by the light control unit which is diagrammatically represented as 56. Thus, as is common in motion picture printing, due allowance is made for under-exposed and over-exposed scenes. The light 57 from the source 55 strikes the aperture plate 58, as is clearly shown in Figure 17 of the drawings, and passes through the aperture 54' which restricts the area of exposure to the pictorial portion 54 of the film and completely masks the sound record portion shown as 59.

In the gate 53 is an aperture plate 60 with an opening 59' which is carefully restricted to the area 59 of the sound recording portion of the film. The light 1 from the source 12 passes through the filter 14 and illuminates this aperture and effects the necessary exposure. The filter 14 may be of any desired color.

The necessity of a hard contrasting image for the sound portion of the film has been emphasized above. Such images, however, in the pictorial portion of the film generally prove very unpleasant. It will be thus seen that our invention makes it possible to use whatever type of light is desirable for the sound record portion of the film and whatever type of light is desirable for the pictorial portion.

The type of printing apparatus which is illustrated in Figures 18 and 19 is useful under certain conditions, as for instance in printing from duplicate negatives which have already been "timed" (that is, in the pictorial parts reduced to a condition of uniform density).

We may make use of a common gate 61 for printing of both the sound images 54 and the pictorial images 59 at the same time. In the front plate 61', we may provide an aperture 62 sufficiently large to expose both images. Into a suitable holder, such as the pieces of bent metal 63 attached to the plate 61' in any suitable manner, the filter 64 covering the portion 59 carrying the sound images may be slipped, this filter, like filters elsewhere in this specification designated by the numeral 14, being of any desired characteristics as to color and density to produce the monochromatic light desired, in cooperation with the particular negative and with the particular emulsion of the positive, to produce the exact photographic results which are desired. Thus the constant polychromatic light illuminates the pictorial portion and selected rays from the same light source illuminate the sound-recording portion.

Our invention is of particular usefulness in printing sound record positive films by the process known in the motion picture art as that of optical reduction, as, for instance, when a negative of 35 millimeters in width is optically projected to form a positive of some smaller size, say 16 or 9 millimeters in width. This reduction in size together with the consequent increase in photographic and other difficulties makes the use of monochromatic light particularly valuable.

As is diagrammatically illustrated in Figure 20 of the drawings, the light 57 may be passed through the gate 52', the portion 54 of the standard or large sized negative 50 which bears the pictorial image, the optical element 66 which may be a lens of any proper characteristics, which reduces the beam of light through the convergence of its rays, and on to the positive film 65, which is of 16 millimeter or some other desired width, less than that of the negative 50, which passes through the gate 52. Similarly, the monochromatic light 1 passes through the gate 53', the portion 59 of the negative 50 which bears the images representing the sound, the optical element 67, and, through convergence of the rays, falls upon the positive film 65 in the gate 53, imprinting thereon a suitable smaller image than that of 59. Or, since duplicate large sized negatives of uniform density are often used as the basis for small-sized positives, the single gate device, previously described above, may be used. In such case, the light 1 passes through the gate 61'' and the optical element 68 and converges upon the smaller-sized positive film 65 in the gate 61. Before reaching the sound-recording portion of the film, however, the polychromatic light passes through a filter 64 in the plate 61', as is illustrated in Figure 19 and described above.

According to one preferred embodiment of our invention, we employ ultra violet light for any and all of the purposes above set forth in connection with visible monochromatic light. Ultra violet light possesses the advantages which we have stated for monochromatic light in the visible spectrum and in addition shows less diffraction than any of the wave lengths of the visible spectrum and is furthermore extremely active photographically. In carrying out our invention by means of the use of ultra violet light, we employ any suitable light source encased in quartz, or a light source which will emit visible and ultra violet light under normal atmospheric conditions, such as, for example, the electric arc and the so-called Nernst lamp. In carrying out our invention in accordance with this exemplification, we use a light source 12 of some such type as we mention above in such structures as those diagrammatically represented in Figures 3, 4, 5, 7, 10, 11, 12, 13, 16, and 18, and in the manner described in connection therewith. Also the fixed light source 15 of Figure 15 may be of the type last above specified. In every instance in which a lens or other similar optical element is employed in connection with ultra violet light it must of course be constructed of quartz, as is well known in the optical art.

It will be readily understood that ultra violet light may be used, as for the source of the light 55 in Figure 16, the light 57 in Figure 20, and the light 1 (without the use of filter 64) in Figure 18, for printing the pictorial portion of the film, but in such cases its usefulness is much restricted, as will be obvious to any one skilled in the art.

In order to combine aperture plate and filter, with the use of ultra violet light, we may employ the aperture plate which is illustrated in Figures 22 and 23. Two pieces of very thin glass or metal 66, separated sufficiently to form a slot 67 of the requisite width are placed between two pieces 68 of plane quartz. It is often found easier to cement two such pieces of glass or metal in the proper position than accurately to cut a slot of this extreme narrowness in either glass or metal or to draw it upon a silvered surface. All of one surface or more of the quartz as required is silvered in order to stop all visible rays. As is illustrated in Figure 24 of the drawings, it is possible to limit the ends of the slot as desired by filling them with some material, such as asphaltum, 69 which is opaque to the particular ray which is being employed. The accuracy of the ends of the slot in most types of apparatus is not as important as is that of the sides.

It will be understood that the disclosures which we have previously made in this specification concerning the selection of a developer with regard to all the factors in any given case, such as wave length of light employed, speed of emulsion, and result to be obtained, apply to all of the previous exemplifications of our invention relating to recording or duplication.

To secure improved and stable translation of sound images into light images and light images into sound images and duplication or printing of sound record films, the theoretically constant light source may be maintained at a point which is actually constant, or approximately constant, as is illustrated, for example, in Figure 25 of the drawings. As has been pointed out above, one set of difficulties caused by the fluctuations of the light sources is removed by the use of monochromatic light. A further embodiment of our invention prevents material change in light intensity.

A common cause of change in intensity of the theoretically constant light source is found in temperature changes which decrease or increase the degree of incandescence of the light element. The common expedient of warming the light source by turning on the current in advance of its use does not meet the difficulties caused by later changes in temperature caused by conditions which later develop. We have found that the opening of a door or window in a room in which apparatus is being used will change the visible characteristics of the light. The means shown for example in Figure 25 definitely controls the heat of the theoretically constant light source.

A light source shielded and controlled as is here set forth may be used as desired in any or all of the previously described exemplifications of our invention. The arrangement here below described is of particular usefulness under any conditions under which an approximately constant light source is desired.

In one embodiment of our invention, we may place the light source 12, which for example may be an incandescent globe of any desired type, in a chamber as for example one with double walls such as 70 and 71, if desired with an air space 72 between them. Fresh air is forced into this chamber 72 by a fan 73 rotative upon a shaft 74 to which is attached a pulley 75, and such air takes the direction shown by the arrows in Figure 25. The pulley 75 may be driven in any desired way, not shown. Through the opening 76 past the baffle plate 77 the fresh air is directed into the inner lamp chamber. The wall 70 being preferably of a heat conductive material, the fresh air, while considerably cooler than the body of air in the chamber, is not of a temperature sufficiently low to cause a drop in the incandescence of the lamp. The heated air leaves the chamber through the vent 78 in the top, which is protected by baffle plates, not shown, as is well known in the projection art, to prevent the escape of objectionable light.

Under some conditions the fan 73 may be dispensed with, sufficient circulation of air being obtained by the heat generated within the chamber.

Light is passed from the source 12 through the optical element 79 which may form the window, as it were, of the lamp chamber. Such optical element may be of a plate of plane glass or quartz, merely to complete the enclosure of the chamber, or it may be a suitable condensing lens or filter. A mirror or other reflecting surface 80 may be provided.

In order positively to maintain the lamp 12 at a given point of incandescence by holding the temperature of the chamber at a predetermined point, a thermostatic element 81 may be provided which, through an appropriate electrical means, controls the amount of current which is permitted to flow into the heating units 82 which may be placed within the chamber.

The thermostatic control of the circuits of the heating units 82 may be accomplished in any of various well known ways. For example, the thermostatic element 81 may be in circuit with the magnetic element 83 which determines the movement of the wiper arm 84 so that it places more or less of the resistance 85 in circuit with the heating elements 82, thus determining their activity.

It will be understood that we do not limit ourselves to this type of control unit and refer to it merely for purposes of illustration.

In order to compensate for changes in incandescence of the light source which might be brought about by changes in the temperature of the lamp chamber, or lamp house as it is generally termed in the motion picture art, we may regulate the amount of current reaching the lamp in accordance with the temperature of the immediate vicinity of the lamp. Such means may be employed independently of the heat maintaining means just described, or in conjunction therewith. For simplicity, we illustrate this phase of our invention in Figure 25, which also illustrates such heat maintaining means.

A thermostatic element 86 may be provided which controls the amount of current which is permitted to flow into the light source 12. As is later set out in further detail, such control is exercised within restricted limits. The thermostatic control of the circuit supplying the source 12 may be accomplished in any of various well known ways. For example, the thermostatic element 86 may be in circuit with the magnetic element 87 which determines the movement of the wiper arm 88 so that it places more or less of the resistance 89 in circuit with the light source 12. The range within which the current reaching the lamp is permitted so to fluctuate is very small. When a light source, particularly an incandescent light source, is operated reasonably near its point of optical efficiency, a relatively small fluctuation in the current reaching such source will have relatively great effect in the intensity of its light output. It will be understood that since uniformity and not intensity is desired, it is preferable to burn the lamp at a point well below that at which injury to the filament is likely. We prefer that the maximum current permitted to reach the lamp by the resistance 89 be sufficiently restricted so that even when the filament is cold such maximum current will not be dangerous to the life of the filament.

As an additional safeguard, to prevent overloading of the circuit supplying the light source, we may place in such circuit an automatic circuit breaker, 90, or other similar device, or the light source 12 may be fed direct from a battery on the line. This control element will positively prevent any amount of current, over the predetermined maximum, reaching the light source 12.

In those cases in which the heating elements and the means for the control of the circuit of the light source are jointly used, it will be readily understood that the usefulness of the latter means generally will be greater in the early stages of any period of operation. After the temperature of the lamp chamber has been brought to the desired point, it will generally be so maintained by the heating elements alone.

It will be readily understood by those skilled in the art that the joint operation of these two means involves no conflict. From the time of beginning operation until the temperature of the lamp chamber reaches the predetermined point, the thermostatic element 81 will operate gradually to increase the amount of resistance 85 in circuit with the heating elements 82 and so render them less and less active. From that point onwardly, the fluctuations of current in the circuit feeding the heating elements 82 will be such as are necessary to maintain that predetermined point of temperature. It is understood that the ventilating device such as heretofore described when the heating units 82 are entirely inactive will prevent the temperature of the chamber from reaching a point higher than the predetermined point.

When operations begin, all resistance 99 will be out of the circuit feeding the light 12, it if desired being protected against overloading as by the element 90. As the temperature of the chamber increases, the amount of such resistance 89 in circuit with the light source 12 gradually increases until the entire amount is in circuit when the temperature reaches the predetermined point. Should such temperature rise still further, as is not contemplated owing to the above-described ventilating system, there would be no change in the amount of such resistance 89 in circuit. Should such temperature fall, the amount of resistance 89 would be decreased until the light source 12 receives the entire amount of current delivered from the line as through the protective device 90. The range of the resistance 89, it will be understood, is carefully limited in accordance with the closely limited range in which current fluctuations occur.

It will be readily understood that the means which have been described above for the control of the heat of the light source as applied to a reproducing apparatus apply with equal usefulness to any type of recording apparatus in which a light source of fixed intensity is used.

It will thus be apparent that the method and construction above described provides extremely simple means whereby sound waves may be accurately and effectively translated into photographic images and these images re-translated with ease and fidelity into sound waves. Also, it will be clear that we provide improved means for the faithful and pleasing duplication of films, particularly sound records of the film phonograph or "talking movie" type.

Other advantages have been referred to throughout the specification from which it becomes apparent that different embodiments of the invention may be made within the scope of the inventive disclosure hereof.

We claim:

1. The method of reproducing sound which consists in projecting a beam of light falling within a predetermined range of wave lengths through a slot past which a black and white sound record film is moved, magnifying the slot image so formed and projecting it upon material the electrical characteristics of which vary in accordance with the light impinging thereupon.

2. The method of reproducing sound which consists in passing a beam of light falling within a predetermined range of wave lengths emitted by a source which is maintained at this predetermined level through a black and white film the translucency of which varies in accordance with the sound which has been previously recorded thereon and upon a material the electrical characteristics of which vary in accordance with the light impinging thereon.

3. The method of reproducing sound which consists in projecting light, from a source the wave length of which is maintained at approximately 4000 Aengstrom units, through a black and white film the translucency of which varies in accordance with the sound which has been previously recorded thereon and upon a material the electrical characteristics of which vary in accordance with the light impinging thereon.

4. The method of recording and reproducing sound which consists in varying operative light in accordance with the sound waves involved; sound first being produced under predetermined conditions and of required characters; a light-sensitive material of a selected speed then being passed in uniform motion; light of selected wave length being projected upon said material through a light passage and thereafter through a positive lens and upon a film having thereon a light-sensitive emulsion of a selected speed; developing said latent images so produced; printing said film by passing therethrough and upon a second light-sensitive film, light of a selected wave-length and devoloping said images so produced; providing a light source positioned in a chamber maintained at a predetermined temperature-level; and projecting light therefrom through a slot and through said second film and through a negative lens upon a material the electrical characteristics of which vary in accordance with the light impinging thereupon; whereby said sound which has been so recorded is reproduced; and keeping said slots free from obstruction by means of a continuous blast of air.

5. The method of recording and reproducing sound which consists in taking a light-sensitive film, causing light which falls within a predetermined range of wave lengths to vary in accordance with the sound to be recorded and to fall upon said light-sensitive film thereby producing latent images; developing the latent images so produced; printing said film by passing therethrough and upon a second light-sensitive film light of a selected wave length thereby producing latent images; developing the latent images so produced upon said second mentioned film; projecting a constant light of a selected wave length through said second mentioned film and upon a material the electrical characteristics of which vary in accordance with said light impinging thereupon; whereby said sound which has been so recorded is reproduced.

6. The method of recording and reproducing sound which consists in taking a light-sensitive film causing a light which falls within a predetermined group of wave lengths to vary in accordance with the sound to be recorded and to fall upon said light-sensitive film thereby producing latent images; developing the latent images so produced into black and white visible images;

printing said film by passing therethrough and upon a second light-sensitive film light of approximately the same wave length as that of the light previously employed, thereby producing latent images, developing the latent images so produced upon said second mentioned film into black and white visible images; projecting a constant light of approximately the same wave length as that of the light previously employed through said black and white images appearing upon said second mentioned film and upon a material the electrical characteristics of which vary in accordance with said light impinging thereupon; whereby said sound which has been so recorded is reproduced.

7. The method of recording and reproducing sound which consists in taking a light-sensitive film, causing light which falls within a predetermined range of wave lengths to vary in accordance with the sound to be recorded and to fall upon said light-senstive film thereby producing latent images; developing the latent images so produced; printing said film by passing therethrough and upon a second light-sensitive film parallel light of a selected wave length thereby producing latent images; developing the latent images so produced upon said second mentioned film; projecting a constant light of a selected wave length through said second mentioned film and upon a material the electrical characteristics of which vary in accordance with said light impinging thereupon; whereby said sound which has been so recorded is reproduced.

8. The method of recording and reproducing sound which consists in taking a light-sensitive film, causing light which falls within a predetermined range of wave lengths to vary in accordance with the sound to be recorded and to fall upon said light-sensitive film thereby producing latent images; developing the latent images so produced; printing said film by passing therethrough and upon a second light-sensitive film convergent light of a selected wave length thereby producing latent images; developing the latent images so produced upon said second mentioned film; projecting a constant light of a selected wave length through said second mentioned film and upon a material the electrical characteristics of which vary in accordance with said light impinging thereupon; whereby said sound which has been so recorded is reproduced.

9. The method of recording and reproducing sound which consists in taking a light-sensitive film, causing light which falls with a predetermined range of wave lengths to vary in accordance with the sound to be recorded and to fall upon said light-sensitive film thereby producing latent images; developing the latent images so produced; printing said film by passing therethrough and upon a second light-sensitive film divergent light of a selected wave length thereby producing latent images; developing the latent images so produced upon said second mentioned film; projecting a constant light of a selected wave length through said second mentioned film and upon a material the electrical characteristics of which vary in accordance with said light impinging thereupon; whereby said sound which has been so recorded is reproduced.

10. The method of recording and reproducing sound which consists in taking a light-sensitive film of a selected speed of between 120 and 200 upon the Hurter and Driffield rating; exposing thereto light of a wave length of approximately 4000 Aengstrom units; varying said light in accordance with the sound waves involved; printing said film by passing light therethrough and upon a light-sensitive film; developing the latent images so produced upon said second mentioned film into black and white visible images; and projecting a constant light through said black and white visible images appearing upon said second mentioned film upon a material the electrical characteristics of which vary in accordance with the light impinging thereupon, whereby said sound which has been so recorded is reproduced.

11. The method of recording and reproducing sound which consists in taking a light-sensitive film of a selected speed of between 120 and 200 upon the Hurter and Driffield rating; exposing thereto light of a wave length of approximately 4000 Aengstrom units; varying said operative light in accordance with the sound waves involved; developing by a developer including glycin the latent images so produced; printing said film by passing therethrough light of a wave length of approximately 4000 Aengstrom units and upon a light-sensitive film and developing upon said second mentioned film the latent images so produced; projecting a constant light of a wave length of approximately 4000 Aengstrom units through said second mentioned film and upon a material the electrical characteristics of which vary in accordance with the said light impinging thereupon; whereby said sound which has been so recorded is reproduced.

12. The method of recording and reproducing sound which consists in exposing a light-sensitive film to light of a selected wave length which varies in accordance with the sound which is being recorded; developing the latent images so produced; printing said film by passing light therethrough and upon a light-sensitive film and developing the latent images so produced upon said second mentioned film; and thereafter projecting a constant light through said second mentioned film, the source for said light being positioned in a chamber the temperature of which is maintained at a predetermined level, and upon a material the electrical characteristics of which vary in accordance with said light impinging thereupon; whereby sound corresponding to that sound which has been so recorded is reproduced.

13. The method of recording and reproducing sound which consists in exposing a light-sensitive film to light of a selected wave length which varies in accordance with the sound which is being recorded, developing the latent images so produced; printing said film by passing light therethrough and upon a light-sensitive film and developing the latent images so produced upon said second mentioned film; and thereafter projecting a constant light through said second mentioned film, said light being maintained at a predetermined level of such character that the light emitted has wave lengths falling within a predetermined range, and upon a material the elecrical characteristics of which vary in accordance with said light impinging thereupon; whereby sound corresponding to that sound which has been so recorded is reproduced.

14. The method of recording and reproducing sound which consists in converging light of a selected wave length which varies in accordance with the sound which is being recorded upon a light-sensitive film; developing the latent images so produced upon said second mentioned film; and thereafter projecting diverging light of a selected wave length through said second mentioned film and upon a material the electrical characteristics of which vary in accordance with said light impinging thereupon; whereby sound corresponding to that sound which has been so recorded is reproduced.

15. The method of recording and reproducing sound which consists in projecting light of a selected wave length which varies in accordance with the sound which is being recorded, through a slot and thereafter through a positive lens and upon a light-sensitive film; developing the latent images so produced; printing said film by passing light therethrough and upon a light-sensitive film and developing the latent images so produced upon said second mentioned film; and thereafter projecting a constant light of a selected wave length through a slot and through said second mentioned film and thereafter through a negative lens and upon a material the electrical characteristics of which vary in accordance with said light impinging thereupon; whereby sound corresponding to that sound which has been so recorded is reproduced.

16. The method of reproducing sound which consists in providing a film having thereupon images representing sound, providing a light source positioned in a chamber which is maintained at a predetermined temperature level, moving said film relatively to said light source, projecting light therefrom through a slot and through said images upon said film and through a negative lens upon material the electrical characteristics of which vary in accordance with the light impinging thereupon, and keeping said slot clean by blowing air upon the same while said film is moving.

17. The method of reproducing sound which consists in projecting through a film having thereupon stable black and white images representing sound, a beam of light falling within a predetermined range of wave lengths, and exposing material the electrical characteristics of which vary in accordance with the light impinging thereupon, and moving said film bearing thereupon said black and white images between said light source and said material and utilizing the current proceeding from said material to reproduce the sound represented by said stable images.

18. The method of reproducing sound which consists in projecting through a film having thereupon stable black and white images representing sound, a beam of parallel light falling within a predetermined range of wave lengths, and exposing material the electrical characteristics of which vary in accordance with the light impinging thereupon, and moving said film bearing thereupon said black and white images between said light source and said material and utilizing the current proceeding from said material to reproduce the sound represented by said stable images.

19. The method of reproducing sound whch consists in projecting through a film having thereupon stable black and white images representing sound, a beam of convergent light falling within a predetermined range of wave lengths, and exposing material the electrical characteristics of which vary in accordance with the light impinging thereupon, and moving said film bearing thereupon said black and white images between said light source and said material and utilizing the current proceeding from said material to reproduce the sound represented by said stable images.

20. The method of reproducing sound which consists in projecting through a film having thereupon stable black and white images representing sound, a beam of divergent light falling within a predetermined range of wave lengths, and exposing material the electrical characteristics of which vary in accordance with the light impinging thereupon, and moving said film bearing thereupon said black and white images between said light source and said material and utilizing the current proceeding from said material to reproduce the sound represented by said stable images.

21. The method of reproducing sound which consists in providing a film having thereupon images representing sound, continuously operating a light source positioned within a chamber, providing material the electrical characteristics of which vary in accordance with the light impinging thereupon, passing said film between said source and said material whereby said light passes through said images and impinges upon said material, and continuously maintaining the heat of the interior of said chamber at a predetermined level whereby the color emanation of said source passing through said images and impinging upon said material remains constant.

22. The method of reproducing sound which consists in projecting through a film having thereupon black and white visible images representing sound, a beam of light falling within a predetermined range of wave lengths, and exposing material the electrical characteristics of which vary in accordance with the light impinging thereupon, to said light and diverging the rays from said light after they have passed through said images whereby they impinge upon said material in an enlarged form.

23. In apparatus for the reproduction of sound, a source of light, a color filter, means for moving a black and white film having sound symbols thereupon, a negative lens, and a light sensitive cell so positioned that a beam of light from said source passes through said filter and successive black and white images upon the moving film and is projected in magnified form upon said cell.

24. In apparatus for the reproduction of sound, a source of light, a chamber in which said light is positioned, means for projecting said light through a film the translucency of which varies in accordance with sound which has been previously recorded thereon and upon a photo-electric cell, and means for supplying predeterminedly heated air within said chamber to facilitate maintaining the heat of said chamber at a predetermined level whereby the color emanation of said lamp remains unchanged so that the effective light output thereof is constant.

25. In apparatus for the reproduction of sound, an electrical source of light, means for projecting said light through a film the translucency of which varies in accordance with sound which has previously been recorded thereon and upon a photo-electric cell, and means operated by the heat generated by said light source for controlling the amount of current reaching said light source.

26. The method of reproducing sound which consists in continuously passing light through a film having thereupon stable images representing sound and upon material the electrical characteristics of which vary in accordance with the light impinging thereupon, the specific response of said material to the light impinging thereupo . being modified by changes in the temperature of the air between the source of said light and said material, maintaining the temperature of at least a portion of the air between said source and said material at a predetermined level during the continued operation of said light source so that unwanted fluctuation is avoided, utilizing such temperature of said portion of the air for controlling said temperature maintaining operation, and utilizing the current proceeding from said material for reproducing the sound represented by said images.

27. In an apparatus of the class described, means for moving a film bearing thereupon stable images representing sound, material the electrical characteristics of which vary in accordance with the light impinging thereupon, means for passing light through said stable images and upon said material, means for utilizing the current proceeding from said material to reproduce the sound represented by said stable images, means immediately associated with said apparatus for maintaining the temperature of a section of the air between said source and said material constant so that unwanted fluctuations caused by temperature variation are avoided, and means automatically operated by the heat of said section of the air between said source and said material for controlling said temperature maintaining means.

28. In an apparatus for the reproduction of sound, a film having thereupon stable images representing sound, a light element cooperating with said images, the characteristics of said light element being such that the cooperation between said light element and said stable images is modified by fluctuations in the temperature of the medium surrounding said element, means associated with said light element for changing said images into audible sound, and means automatically operated by the heat of said medium and associated with said apparatus for maintaining said medium at a predetermined temperature so that unwanted fluctuation of said temperature and hence of said audible sound are avoided.

29. In apparatus for the reproduction of sound, an electrical source of light continuously operable, means for projecting said light through a black and white film the translucency of which varies in accordance with the sound which has been recorded thereon and upon a photo-electric cell, and means effective to maintain the incandescence of said light source during its continued operation at a predetermined level of such character that the light emitted has a wave length of from 2800 to 4800 Aengstrom units.

30. In an apparatus of the character described, a light source, and an enclosed housing therefor, said housing comprising an inner wall and an outer wall spaced from each other, an inlet in said outer wall for fresh air and an opening in said inner wall disposed at a distance from said inlet whereby such fresh air when it enters said lamp chamber is heated by contact with said inner wall before it reaches said inlet whereby chilling of said source is prevented when said air reaches the interior of said housing.

31. In an apparatus of the character described, a light source, and an enclosed housing therefor, said housing comprising an inner wall and an outer wall spaced from each other, an inlet in said outer wall and an opening in said inner wall disposed at a distance from said inlet, and means for forcing fresh air through said inlet, about said inner wall whereby such fresh air is heated thereby, and through said opening and into the interior of said housing.

32. In an apparatus of the character described, a light source, and an enclosed housing therefor, said housing comprising an inner wall and an outer wall spaced from each other, an inlet in said outer wall for fresh air and an opening in said inner wall for the passage of such air disposed at a distance from said inlet, and a baffle plate disposed in said chamber opposite said opening.

33. In an apparatus of the character described, means for moving a film, a source for passing light to said film, a housing for said light source, means for passing fresh air therewithin, and means for heating such air above room temperature before its introduction therewithin to maintain the source of light at a uniform temperature whereby the color emanation of said source remains unaffected by the introduction of said fresh air so that the effective light output of said source is constant.

34. In an apparatus of the character described, means for moving a film, a source for passing light to said film, a housing for said light source, and variable means other than said source immediately associated with said housing for heating the interior of said housing, whereby the heat within said lamp housing during the initial period of operation of said source may be increased so that the effective light output from said source is constant during the initial period and the following periods.

35. In an apparatus of the character described, means for moving a film, a source for passing light to said film, a housing for said light source, and means for maintaining the interior of said housing at a predetermined temperature, said means including devices for introducing fresh air in to the interior of said housing, and devices for first bringing said air to a predetermined temperature whereby the color emanation of said light source remains unchanged so that the effective light output thereof is constant.

36. In an apparatus of the character described, means for moving a film, a source for passing light to said film, a housing for said light source, a heating element therewithin, and means for controlling said element in accordance with the temperature within said housing.

37. In an apparatus of the character described, a light source, a housing therefor, and means for varying the amount of current reaching said source in accordance with the heat within said housing for maintaining the color emanation of said light source unchanged so that the effective light output of said source is continuously constant.

38. In an apparatus of the character described, a light source, a housing therefor, a variable resistance in circuit with said source, and means for changing the amount of such resistance for varying the current reaching said light source in accordance with the temperature within said housing whereby the color emanation of said light source remains unchanged so that the effective light output of said source is constant.

39. In an apparatus of the character described, a light source, a housing therefor, a variable resistance in circuit with said source, a thermostatic element within said chamber, and an operating connection between said element and said resistance so constructed and arranged that the amount of such resistance in circuit with said means is controlled by said element.

40. In an apparatus of the character described, an electric light source, a housing therefor, means other than said source for heating said housing, and automatic means for regulating the amount of current reaching said source in accordance with fluctuations of the temperature of the air within said housing.

41. In an apparatus of the character described, means for feeding a film, a source for passing light through the film, a housing for said source, and means for maintaining the incandescence of said source at a pre-determined level, said means comprising means for preventing unwanted fluctuations in the amount of current reaching said source, means for increasing the amount of such current until such source has been operated for an initial period, and means for maintaining said housing at a pre-determined temperature.

42. In an apparatus of the character described, means for feeding a film, a source for passing light through the film, a housing for said source, and means for maintaining the incandescence of said source at a pre-determined level, said means including devices operating automatically for varying the heat of said light source according to the temperature of the air in said housing.

43. In an apparatus of the character described, means for feeding a film, an incandescent source of light which is passed through the film, a housing for said source, and means for automatically maintaining the incandescence of said source at a pre-determined level, said means including means for increasing the amount of current reaching said source for a pre-determined initial period.

44. In an apparatus of the character described, means for feeding a film, a source for passing light through the film, a housing for said source, and means for maintaining the incandescence of said source at a pre-determined level, said means comprising means for initially increasing the amount of such current reaching said source and means for maintaining the interior of said housing at a pre-determined temperature after such initial period.

45. In an apparatus of the character described, a light source for producing ultra-violet rays, means to transmit the same, an aperture through which said rays are passed, and light sensitive material upon which said light rays impinge, said aperture consisting of a plurality of substances impenetrable by ultra-violet rays held in place between sheets of a substance through which ultra-violet rays may pass, said first mentioned substances being positioned in such manner as to create a slot opening therebetween.

46. In an apparatus of the character described, a slot structure which comprises two sheets of plane quartz and two sheets of a substance impenetrable to ultra-violet rays placed therebetween in the same plane and so disposed that the adjacent edges thereof are parallel to each other and slightly separated from each other whereby a slot is created through which ultra-violet rays may pass.

47. In an apparatus of the character described, a slot structure, a black-and-white film, and means for passing light of a selected wave length through said slot structure and through said film, said slot structure comprising two sheets of plane quartz and two sheets of a substance impenetrable to light of such selected wave length placed therebetween in the same plane and so disposed that the adjacent edges thereof are parallel to each other and slightly separated from each other whereby a slot is created through which such rays may pass.

48. In an apparatus of the character described, a slot structure which comprises two sheets of plane quartz and two sheets of glass placed therebetween in the same plane and so disposed that the adjacent edges thereof are parallel to each other and slightly separated from each other whereby a slot is created through which ultra-violet rays may pass.

49. In an apparatus of the character described, a gate through which a film is fed, a source for passing light therethrough, said gate comprising two sheets of plane quartz between which the film travels, means for resiliently maintaining one of said sheets against the other and a film therebetween, and markings upon one of said sheets for rendering all thereof except a relatively limited pre-determined portion impenetrable to the rays from such source.

50. In an apparatus of the character described, a slot, means for feeding a film past said slot, mechanism for moving air about said slot, and an operating connection between said means and mechanism whereby said means operates said mechanism.

51. In an apparatus of the character described, a slot, means for feeding a film past said slot, mechanism for moving air through said slot, and an operating connection between said means and said mechanism whereby said mechanism is automatically maintained operative during the operation of said means.

52. In an apparatus of the character described, a slot, means for feeding a film past said slot, and a duct for delivering air to said slot, said duct being so arranged adjacent its point of connection with said slot that such air strikes said slot at other than a right angle to the surface of the film which is fed past said slot.

53. In an apparatus of the character described, a slot, means for feeding a film past said slot, a duct for delivering air to said slot, and a baffle plate adjacent the end of said duct adjacent said slot so positioned that such air strikes said slot other than at right angles to the surface of the film which is fed past said slot.

CARL LOUIS OSWALD.
WARREN DUNHAM FOSTER.